(12) United States Patent
Hurup et al.

(10) Patent No.: US 12,152,561 B2
(45) Date of Patent: Nov. 26, 2024

(54) METHOD FOR MANUFACTURING A WIND TURBINE BLADE AND WIND TURBINE BLADE

(71) Applicant: Siemens Gamesa Renewable Energy A/S, Brande (DK)

(72) Inventors: Allan Hurup, Nibe (DK); Jens Jørgen Østergaard Kristensen, Nørresundby (DK); Gabriele Chiesura, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 73 days.

(21) Appl. No.: 17/611,932

(22) PCT Filed: May 15, 2020

(86) PCT No.: PCT/EP2020/063605
§ 371 (c)(1),
(2) Date: Nov. 17, 2021

(87) PCT Pub. No.: WO2020/244902
PCT Pub. Date: Dec. 10, 2020

(65) Prior Publication Data
US 2022/0228553 A1 Jul. 21, 2022

(30) Foreign Application Priority Data
Jun. 7, 2019 (EP) ..................... 19179026

(51) Int. Cl.
*F03D 1/06* (2006.01)
*B29C 70/34* (2006.01)
*B29L 31/08* (2006.01)

(52) U.S. Cl.
CPC .......... *F03D 1/0675* (2013.01); *B29C 70/342* (2013.01); *B29L 2031/085* (2013.01);
(Continued)

(58) Field of Classification Search
CPC .............. F03D 1/0675; F05B 2240/302; F05B 2230/20; F05B 2230/60; F05B 2280/6013; B29L 2031/085; B29C 70/342
See application file for complete search history.

(56) References Cited

U.S. PATENT DOCUMENTS 10,041,471 B1   8/2018 Kimura et al.
11,028,825 B2 * 6/2021 Hunter .................. F03D 1/0675
(Continued)

FOREIGN PATENT DOCUMENTS

CN         1759002 A      4/2006
CN       101070816 A     11/2007
(Continued)

OTHER PUBLICATIONS

International Search Report & Written Opinion for PCT/EP2020/063605 issued on Aug. 20, 2020.

*Primary Examiner* — Sang K Kim
(74) *Attorney, Agent, or Firm* — Schmeiser, Olsen & Watts LLP (57) ABSTRACT

A method for manufacturing a wind turbine blade, comprising the steps of: arranging (S2, S3) a joining portion (8) comprising a fibre lay-up inside adjacent blade sections, covering (S4) the joining portion (8) and the adjacent blade sections at least partially with a vacuum bag, and applying vacuum to a space (54) covered by the vacuum bag (19, 38), infusing at least the fibre lay-up (12, 13, 14, 15, 16, 17) with a resin (43) and curing (S5) the resin (43) to obtain a cured joining portion (44) joining the blade sections (20, 24) inside. A light-weight and at the same time strong blade section joint is provided. In particular, the strength of this laminate joint formed by vacuum infusion is comparable to the strength of the pristine laminate. Compared to a connection using an adhesive, the laminate joint formed by (Continued)

vacuum infusion provides a lighter and stronger blade section joint, in particular, a better weight-to-strength performance.

20 Claims, 11 Drawing Sheets

(52) U.S. Cl.
CPC ....... *F05B 2230/20* (2013.01); *F05B 2230/60* (2013.01); *F05B 2240/302* (2013.01); *F05B 2280/6013* (2013.01)

(56) References Cited

U.S. PATENT DOCUMENTS

| | | | |
|---|---|---|---|
| 2007/0253824 A1 | 11/2007 | Eyb | |
| 2009/0155084 A1 | 6/2009 | Livingston et al. | |
| 2010/0236693 A1 | 9/2010 | Bech et al. | |
| 2013/0129518 A1 | 5/2013 | Hayden et al. | |
| 2014/0186189 A1 | 7/2014 | Stege | |
| 2017/0001387 A1 | 1/2017 | Ostergaard et al. | |
| 2017/0058863 A1 | 3/2017 | Yarbrough et al. | |
| 2017/0334146 A1 | 11/2017 | Suzuki | |
| 2018/0216601 A1 | 8/2018 | Yarbrough et al. | |
| 2018/0274517 A1 | 9/2018 | Gruhn et al. | |
| 2019/0032632 A1* | 1/2019 | Danielsen | F03D 80/50 |
| 2019/0211801 A1 | 7/2019 | Ravn et al. | |
| 2019/0234374 A1 | 8/2019 | Roberts et al. | |
| 2020/0001562 A1* | 1/2020 | Bürkner | B29C 53/62 |
| 2021/0190034 A1 | 6/2021 | Wang et al. | |
| 2022/0072812 A1* | 3/2022 | Huth | B29C 70/08 |

FOREIGN PATENT DOCUMENTS

| | | |
|---|---|---|
| CN | 101392720 A | 3/2009 |
| CN | 101457781 A | 6/2009 |
| CN | 102248678 A | 11/2011 |
| CN | 103600498 A | 2/2014 |
| CN | 103899476 A | 7/2014 |
| CN | 104210116 A | 12/2014 |
| CN | 106457696 A | 2/2017 |
| CN | 106662070 A | 5/2017 |
| CN | 108087191 A | 5/2018 |
| CN | 109563805 A | 4/2019 |
| CN | 109642538 A | 4/2019 |
| EP | 1 310 351 A1 | 5/2003 |
| EP | 2432972 B1 | 7/2018 |
| TW | 201730249 A | 9/2017 |
| WO | 2016/198075 A1 | 12/2016 |
| WO | 2018/091735 A1 | 5/2018 |

\* cited by examiner

METHOD FOR MANUFACTURING A WIND TURBINE BLADE AND WIND TURBINE BLADE

CROSS-REFERENCE TO RELATED APPLICATIONS

This application claims priority to PCT Application No. PCT/EP2020/063605, having a filing date of May 15, 2020, which claims priority to EP Application No. 19179026.0, having a filing date of Jun. 7, 2019, the entire contents both of which are hereby incorporated by reference.

FIELD OF TECHNOLOGY

The following relates to a method for manufacturing a wind turbine blade and to a wind turbine blade.

BACKGROUND

One way to produce more power using a wind turbine under given wind conditions is to increase the size of the blades. However, the manufacture of wind turbine blades and their transportation to wind harvesting sites is becoming increasingly difficult for increasing blade sizes. Therefore, wind turbine blades are, for example, manufactured sectionwise and joined on-site. It is desirable to keep the number of processing steps necessary for joining the blade sections as small as possible. Furthermore, the joints must be configured sufficiently strong to withstand the forces acting on the blade during operation of the wind turbine. Blade sections are connected to each other either by bonding (using an adhesive or a laminate), bolting or by a combination of both.

WO 2016 198 075 A1 discloses a modular wind turbine blade comprising first and second blade modules having spar caps embedded within their outer shells. The spar caps taper in thickness such that they are tapered from the blade outer surface to the blade inner surface as the thickness decreases resulting in inwardly tapered recesses being defined in the outer shells. The tapered recesses in the first and second blade modules are aligned when the modules are placed end-to-end to form a continuous double-tapered channel. A connecting member having a double-tapered structure is bonded in the channel to connect the modules together. An adhesive is used to bond the connecting member in the double-tapered channel. This bonding process has to be performed from the blade outside due to the inwardly tapered recesses.

To avoid problems with glue joints such as cracks in the glue line, EP 1 310 351 A1 proposes a method for joining modular wind turbine blades of composite materials mainly in one piece by vacuum infusion avoiding any glue joints.

SUMMARY

An aspect relates to an improved method for manufacturing a wind turbine blade and an improved wind turbine blade.

Accordingly, a method for manufacturing a wind turbine blade is proposed. The method comprises the steps of:
arranging a joining portion comprising a fiber lay-up inside adjacent blade sections,
covering the joining portion and the adjacent blade sections at least partially with a vacuum bag, and
applying vacuum to a space covered by the vacuum bag, infusing at least the fiber lay-up with a resin and curing the resin to obtain a cured joining portion joining the blade sections inside.

Thus, a light-weight and at the same time strong blade section joint is provided. In particular, the strength of this laminate joint formed by vacuum infusion is comparable to the strength of the pristine laminate. Compared to a connection using an adhesive, the laminate joint formed by vacuum infusion provides a lighter and stronger blade section joint, in particular, a better weight-to-strength performance. This is because in the case of an adhesive, the weight of the adhesive is added in the bond line and the interlaminar shear strength drops as the bond line thickness increases. Further, the laminate joint formed by vacuum infusion avoids the problem of glue joints of having a different material in the glue than in the rest of the blade.

Furthermore, the proposed method for manufacturing a wind turbine blade allows to perform the joining process of the blade sections from inside the blade cavity. This facilitates the manufacturing process as there are joining processes, such as a web connection, which can only be performed from inside the blade cavity anyway. A wind turbine blade usually comprises a (shear) web in its interior cavity. Connecting the web of one blade section to the web of another blade section can only be done from inside the blade cavity. Furthermore, as wind turbine blades are increasing in size, the sizes of the cross-sections of the blade sections are also increasing in size. In particular, the inner cavities of the blade sections are large enough to allow workers to perform work, such as joining processes, from inside the blade.

In addition, with the proposed joining method using the joining module arranged inside the blade sections and the vacuum infusion process, the joining of the two blade sections can be realized with a reduced number of wet processes and curing steps. For example, only one wet process, i.e., resin infusion, and only one curing cycle might be necessary.

The wind turbine blade is part of a rotor of a wind turbine. The wind turbine is an apparatus to convert the wind's kinetic energy into electrical energy. The wind turbine comprises, for example, the rotor having one or more of the blades connected each to a hub, a nacelle including a generator, and a tower holding, at its top end, the nacelle. The tower of the wind turbine may be connected via a transition piece to a foundation of the wind turbine, such as a monopile in the seabed.

The wind turbine blade comprises two or more blade sections dividing the blade in a lengthwise direction. In particular, the adjacent blade sections are arranged adjacent to each other in a lengthwise direction of the blade. A first one of the adjacent blade sections is, for example, an inboard blade section. The inboard blade section comprises, for example, a root section connected to the hub of the rotor. A second one of the adjacent blade sections is, for example, an outboard blade section. The outboard blade section comprises, for example, a blade tip. In addition to the described first and second blade sections, the wind turbine blade may also comprise one or more further blade sections. The one or more further blade sections may be joined with each other and/or with the described first and/or second blade sections by the same joining process by which the first blade section is joined with the second blade section.

The wind turbine blade, e.g., the root section, is, for example, fixedly connected to the hub. The wind turbine blade is, for example, directly bolted to the hub.

Alternatively, the wind turbine blade, e.g., the root section, is rotatably connected to the hub. For example, the wind turbine blade is connected to a pitch bearing of the wind turbine, and the pitch bearing is connected to the hub.

The pitch bearing is configured to adjust the angle of attack of the blade according to the wind speed to control the rotational speed of the blade.

Apart from the (cylindrical) root section connected with the hub, the wind turbine blade is formed aerodynamically. The wind turbine blade, i.e., each of its blade sections, comprises, for example, a pressure side (upwind side) and a suction side (downwind side). The pressure side and the suction side are connected with each other at a leading edge and a trailing edge. The pressure and suctions sides and the leading and trailing edges define an interior cavity of the wind turbine blade.

Two adjacent blade sections might be arranged adjacent to each other such that the blade sections abut each other. Alternatively, there might be a small gap between the adjacent blade sections which may be filled by the (cured) joining portion. The gap may be minimal.

Arranging the joining portion inside the adjacent blade sections includes, in particular, overlapping the fiber lay-up of the joining portion with the blade sections in a joining area of the blade sections.

The resin is infused and cured from inside the wind turbine blade cavity. Before infusing and curing the resin, the vacuum bag is sealed and a vacuum is generated inside the sealed vacuum bag. The resin is, for example, cured by applying heat.

The fiber lay-up embedded in the infused and cured resin is forming the cured joining portion. The cured joining portion is, in particular, a fiber-reinforced resin laminate.

The phrase "a cured joining portion joining the blade sections inside" is to say that the cured joining portion joins or connects the blade sections on their inside surfaces, i.e., surfaces of the blade sections that face an open or closed cavity within each blade section.

According to an embodiment, each of the adjacent blade sections comprises an outwardly tapered portion such that the outwardly tapered portions form a common recess. Further, the joining portion is arranged inside the adjacent blade sections by arranging the joining portion in the common recess.

By having the outwardly tapered portions of the adjacent blade sections, the outer surfaces of the blade sections can be finished prior to the joining process. In particular, there is no need for additional filling, coating and/or painting of the outer surface of the blade after the joining process.

Each of the adjacent blade sections comprises at an end portion thereof an outwardly tapered portion. In particular, each of the blade sections is tapered outwardly towards a joining interface with the other blade section. Further, each of the blade sections is tapered outwardly such that each of the blade sections forms an inner recess. The inner recesses of the blade sections form a common recess when the blade sections are arranged adjacent to each other. The common inner recess is filled by the fiber lay-up of the joining portion.

The joining portion is arranged inside the common recess by, firstly, arranging the joining portion in the inner recess of a first one of the blade sections. Then, a second one of the blade sections is arranged adjacent to the first one of the blade sections such that the inner recess of the second one of the blade sections receives the joining portion.

A thickness of a blade shell, beam and/or web decreases towards the interface with the other blade section to form the outwardly tapered portion. The outwardly tapered portion may, for example, be configured such that the thickness of its blade shell, beam and/or web decreases linearly towards the interface with the other blade section. The outwardly tapered portion may, for example, be configured such that the thickness of its blade shell, beam and/or web decreases stepwise or curved towards the interface with the other blade section.

In embodiments, each blade section may comprise at a certain end portion thereof two or more outwardly tapered portions. In particular, each of the two or more outwardly tapered portions of a first blade section corresponds to an outwardly tapered portion of a second blade section. Further, each of the two or more outwardly tapered portions of the first and second blade sections form a common recess. Further, in this case, the joining portion is arranged inside the adjacent blade sections by arranging the joining portion in the two or more common recesses.

According to a further embodiment, the joining portion is provided on a mandrel. Further, the joining portion is arranged inside the adjacent blade sections by arranging the mandrel with the joining portion inside the adjacent blade sections.

Using a mandrel allows to pre-pack the fiber lay-up on the mandrel. For example, the fiber-lay-up may be pre-packed on the mandrel off-site and transported to the assembling site. The assembling site is, for example, a harbour site in the case of an offshore wind turbine, or an erection site in the case of an onshore wind turbine. Further, the fiber lay-up may be pre-packed on the mandrel in parallel to the manufacturing of the blade sections. Thus, the manufacturing time for the blade can be reduced.

Further, a mandrel allows a better forming of the fiber lay-up infused with resin during curing by using the mandrel as a mould.

The mandrel may comprise two or more mandrel portions.

Before packing the fiber lay-up on the mandrel, a vacuum bag may be arranged on the mandrel. The fiber lay-up may then be arranged on the vacuum bag.

In embodiments, the method might comprise the step of removing the vacuum bag and/or the mandrel, after infusing and curing the resin. The mandrel and/or the vacuum bag is, for example, removed through the blade root section.

According to a further embodiment, the fiber lay-up comprises a fiber lay-up forming, once cured, one or more beam joints joining one or more beams of a first one of the adjacent blade sections with one or more corresponding beams of a second one of the adjacent blade sections.

Having the joining portion comprising a fiber lay-up forming one or more beam joints allows to provide a lightweight and strong blade section joint including one or more beam joints in a more efficient manufacturing process.

According to a further embodiment, the one or more beams comprise a pressure-side beam, a suction-side beam, a leading-edge beam or reinforcement and/or a trailing edge beam or reinforcement.

A pressure-side beam is, in particular, a beam on the pressure side of the wind turbine blade. A suction-side beam is, in particular, a beam on the suction side of the wind turbine blade. A leading-edge beam or reinforcement is, in particular, a beam and/or reinforcement on the leading edge of the wind turbine blade. A trailing edge beam or reinforcement is, in particular, a beam and/or reinforcement on the trailing edge of the wind turbine blade.

Having the joining portion comprising a fiber lay-up for a pressure-side beam, a suction-side beam, a leading-edge beam and/or a trailing edge beam allows to provide a light-weight and strong blade section joint including a pressure-side beam joint, a suction-side beam joint, a leading-edge beam joint and/or a trailing edge beam joint. In particular, the joining portion may include the fiber lay-up forming several or all of these beams. Thus, several or all of these beams may be joined in a single process step by infusing and curing the resin.

According to a further embodiment, the fiber lay-up comprises a fiber lay-up forming, once cured, a shell joint joining a shell of a first one of the adjacent blade sections with a shell of a second one of the adjacent blade sections.

Having the joining portion comprising a fiber lay-up for the shell allows to provide a light-weight and strong blade section joint including a shell joint in a more efficient manufacturing process. In particular, the shell and several or all of the beams may be joined in a single process step by infusing and curing the resin.

According to a further embodiment, the fiber lay-up comprises a fiber lay-up forming, once cured, a web joint joining a web of a first one of the adjacent blade sections with a web of a second one of the adjacent blade sections.

The (shear) web connects, in particular, the blade shells of the pressure side and the suction side in the interior cavity of the blade. The web provides shear strength to the blade.

Having the joining portion comprising the fiber lay-up for the web allows to provide a light-weight and strong blade section joint including a web joint. In particular, the web and the shell and/or several or all of the beams may be joined in a single process step by infusing and curing the resin.

According to a further embodiment, the joining portion is arranged inside the adjacent blade sections comprising a first one of the blade sections and a second one of the blade sections by:
  inserting the joining portion partially into the first one of the blade sections such that a portion of the joining portion protrudes from the first one of the blade sections, and
  arranging the second one of the blade sections adjacent to the first one of the blade sections such that the second one of the blade sections receives the portion of the joining portion protruding from the first one of the blade sections.

Inserting the joining portion partially into the first one of the blade sections and arranging the second one of the blade sections on the protruding portion of the joining portion allows to more easily arrange the joining portion. Further, it allows to better position the second one of the blade sections adjacent to the first one of the blade sections.

According to a further embodiment, the joining portion is arranged inside the adjacent blade sections by a lifting tool.

The lifting tool is, in particular, a crane or a lifting vehicle. Having the lifting tool allows to better arrange and position the joining portion.

According to a further embodiment, the fiber lay-up includes glass fibers, carbon fibers, aramid fibers and/or natural fibers.

According to a further embodiment, the fiber lay-up comprises fibers in dry condition.

Fibers in dry condition are, in particular, fibers without a resin. Fibers in dry condition are more flexible compared to fibers with resin such as fibers casted in resin or pre-impregnated fibers (prepreg). Thus, using fibers in dry condition for the joining portion and infusing and curing the resin only after arranging the joining portion inside the blade sections allows to better match the shape of the joining portion to the shape of the adjacent blade sections. Hence, the requirements of manufacturing adjacent blade sections with geometries matching the joining portion is reduced.

According to a further embodiment, the fiber lay-up includes a core material such as wood, balsa, PET foam and/or PVC foam.

When the fiber lay-up including the core material is infused and cured with the resin, a fiber-reinforced resin laminate with a core structure made from the core material is obtained. For example, a sandwich-structured fiber-reinforced resin laminate may be obtained in which a layer of the core material is arranged between layers of fiber-reinforced resin.

Having the core material allows to reduce the weight of the final fiber-reinforced resin laminate while maintaining a sufficient rigidity and/or strength of the blade.

According to a further embodiment, the resin includes thermosets, thermoplastics, epoxy, polyurethane, vinyl ester and/or polyester.

According to a further embodiment, the method comprises, after infusing and curing the resin, the step of applying a sealing band covering a separation line between the adjacent blade sections from the outside.

Applying the sealing band allows to cover a small gap between the adjacent blade sections.

According to a further aspect, a wind turbine blade is provided. The wind turbine blade comprises adjacent blade sections and a joining portion arranged inside the adjacent blade sections. Further, the joining portion comprises a fiber lay-up embedded in cured resin and joins the adjacent blade sections inside.

The embodiments and features described with reference to the method of the present invention apply mutatis mutandis to the wind turbine blade of embodiments of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
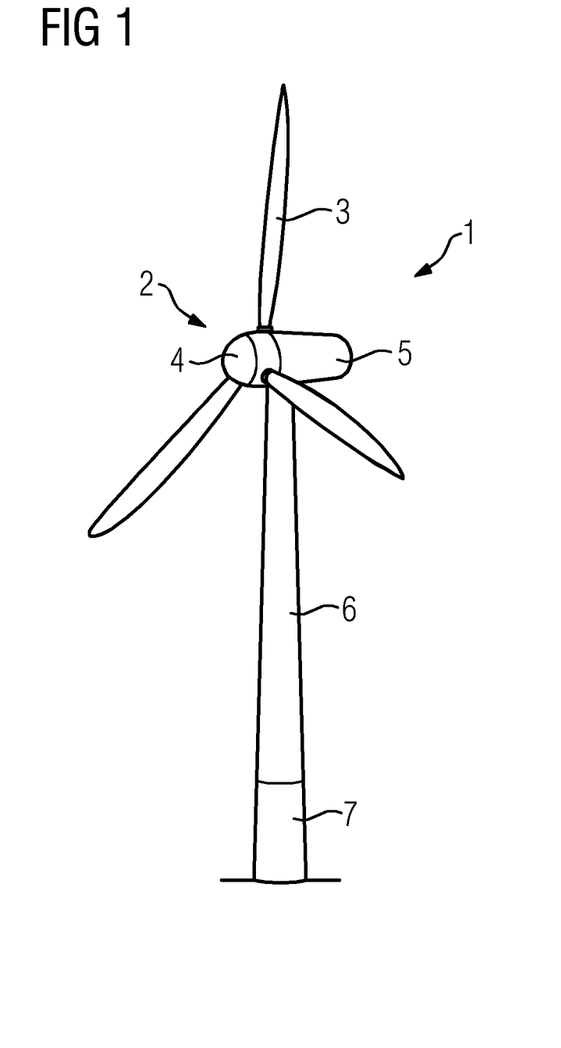
FIG. 1 shows a wind turbine according to an embodiment.

FIG. 1 shows a wind turbine 1 according to an embodiment. The wind turbine 1 comprises a rotor 2 having one or more blades 3 connected to a hub 4. The hub 4 is connected to a generator (not shown) arranged inside a nacelle 5. During operation of the wind turbine 1, the blades 3 are driven by wind to rotate and the wind's kinetic energy is converted into electrical energy by the generator in the nacelle 5. The nacelle 5 is arranged at the upper end of a tower 6 of the wind turbine 1. The tower 6 is erected on a foundation 7 such as a monopile or tripile. The foundation 7 is connected to and/or driven into the ground or seabed.

In the following an improved method for manufacturing a wind turbine blade 3 comprising two or more blade sections 20, 24 is described with respect to FIGS. 2 to 18.

Figure 2:
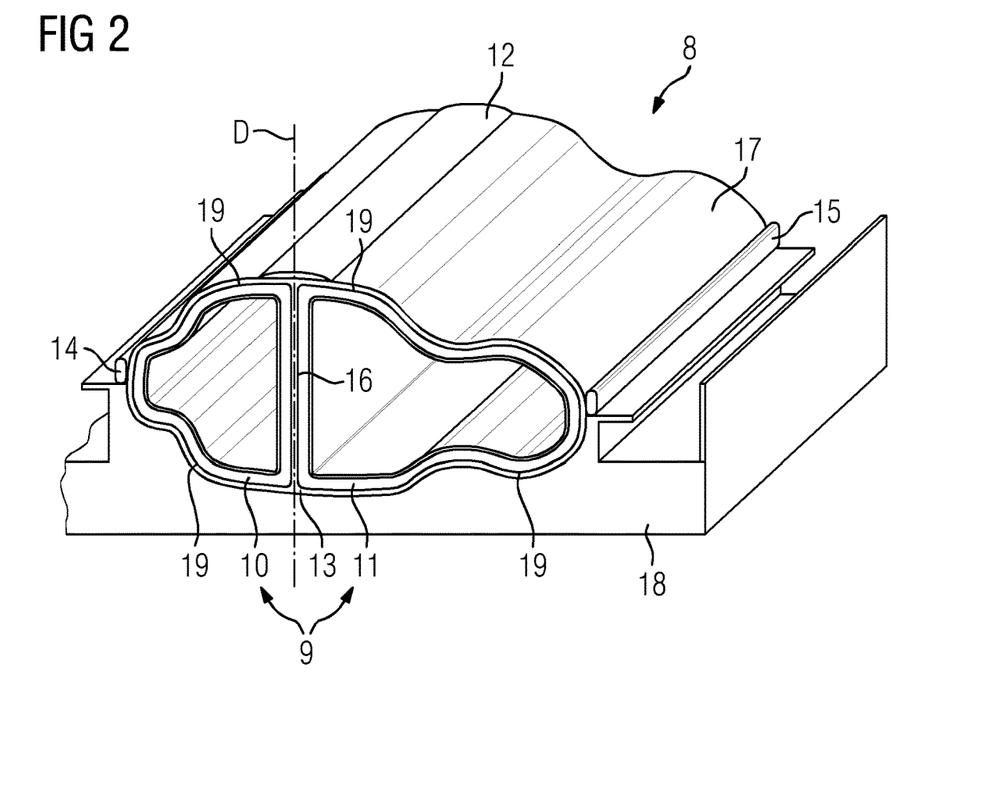
FIG. 2 shows a perspective view of a joining portion on a mandrel according to an embodiment, the joining portion being configured for joining two blade sections of a blade of the wind turbine of FIG. 1.

In step S1 of the method, a joining portion 8 is provided on a mandrel 9, as shown in FIG. 2. The mandrel 9 comprises a first mandrel portion 10 and a second mandrel portion 11. The joining portion 8 comprises a fiber lay-up 12 for a pressure-side beam joint and a fiber lay-up 13 for a suction-side beam joint. Further, the joining portion 8 comprises a fiber lay-up 14 for a leading-edge beam joint and a fiber lay-up 15 for a trailing edge beam joint. Furthermore, the joining portion 8 comprises a fiber lay-up 16 for a web joint. The fiber lay-up 16 for the web joint is arranged between the first and second mandrel portions 10 and 11. The joining portion 8 comprises in addition a fiber lay-up 17 for a shell joint.

In the described example, the fiber lay-ups 12, 13, 14, 15 and 17 for the beams and the shell comprise fibers in dry condition, i.e., without resin. Further, in the described example, the fiber lay-up 16 for the web joint comprises both fibers in dry condition as well as pre-casted fibers.

Figure 3:
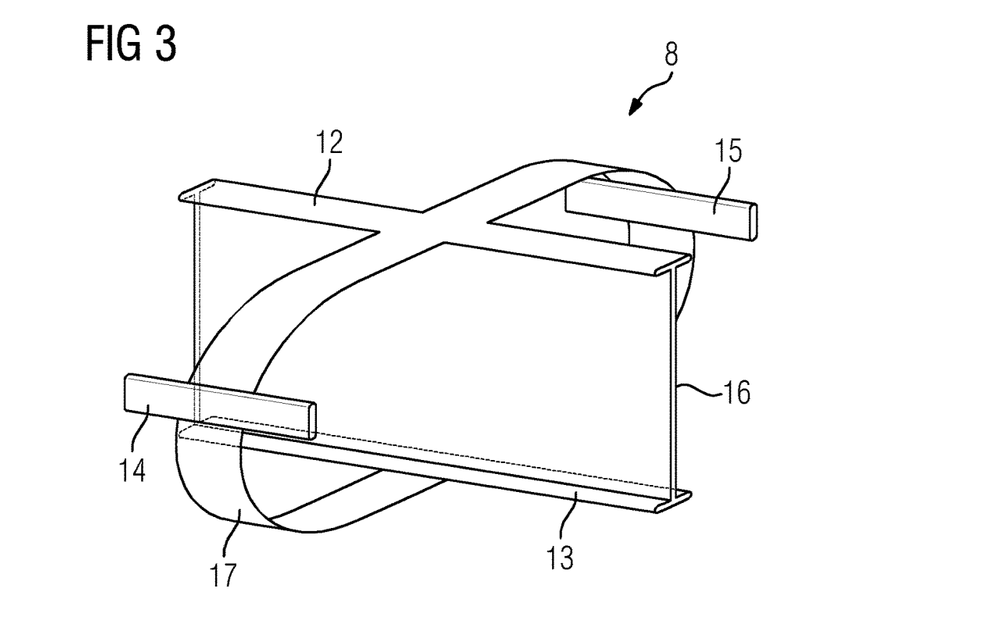
FIG. 3 shows the joining portion of FIG. 2 without the mandrel.

FIG. 3 shows the joining portion 8 of FIG. 2 without the mandrel 9 for illustration purposes.

For pre-packing the joining portion 8 as shown in FIG. 2, firstly a mould 18 is provided. On the mould 18, the fiber lay-up 13 for the suction-side beam joint and a part of the fiber lay-up 17 for the shell joint are provided. Then, vacuum bags 19 are provided on the fiber lay-ups 13, 17. In the next step, the mandrel 9, i.e., the mandrel portions 10 and 11, is arranged. The vacuum bags 19 are wrapped around the mandrel portions 10 and 11 at the leading edge and trailing edge side. Also, the fiber lay-up 16 for the web joint is arranged. Next, the fiber lay-up 12 for the pressure-side beam joint, the fiber lay-up 14 for the leading-edge beam joint, the fiber lay-up 15 for the trailing edge beam joint, and the remaining of the fiber lay-up 17 for the shell joint are provided. Finally, the vacuum bags 19 are arranged such that all fiber lay-ups 12, 13, 14, 15, 16 and 17 are covered on one side thereof by a vacuum bag 19. When using a mandrel 9 comprising more than one mandrel portion 10, 11, more than one vacuum bag 19 may be required.

In step S2 of the method, the joining portion 8 comprising the fiber lay-ups 12, 13, 14, 15, 16 and 17 for the beam, shell and web joints is inserted together with the mandrel 9 partially into a first blade section 20.

Figure 4:
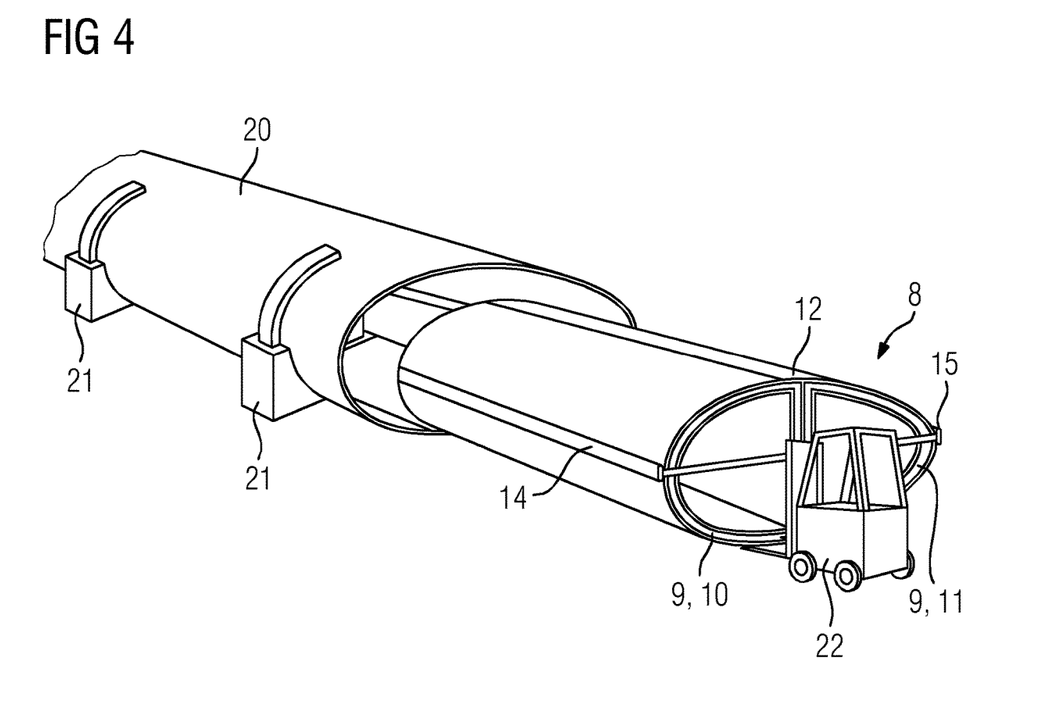
FIG. 4 shows a perspective view of the joining portion of FIG. 2 during inserting it into a first blade section.

FIG. 4 illustrates step S2 of arranging the joining portion 8 in the first blade section 20 of the wind turbine 1. The first blade section 20 has, in particular, been manufactured using fiber-reinforced resin. The first blade section 20 has, for example, been manufactured simultaneously to the step S1 of pre-packing the joining portion 8. In this example, the first blade section 20 is an inboard section of the blade 3. However, the joining portion 8 could also be inserted into an outboard section of the blade 3.

Figure 5:
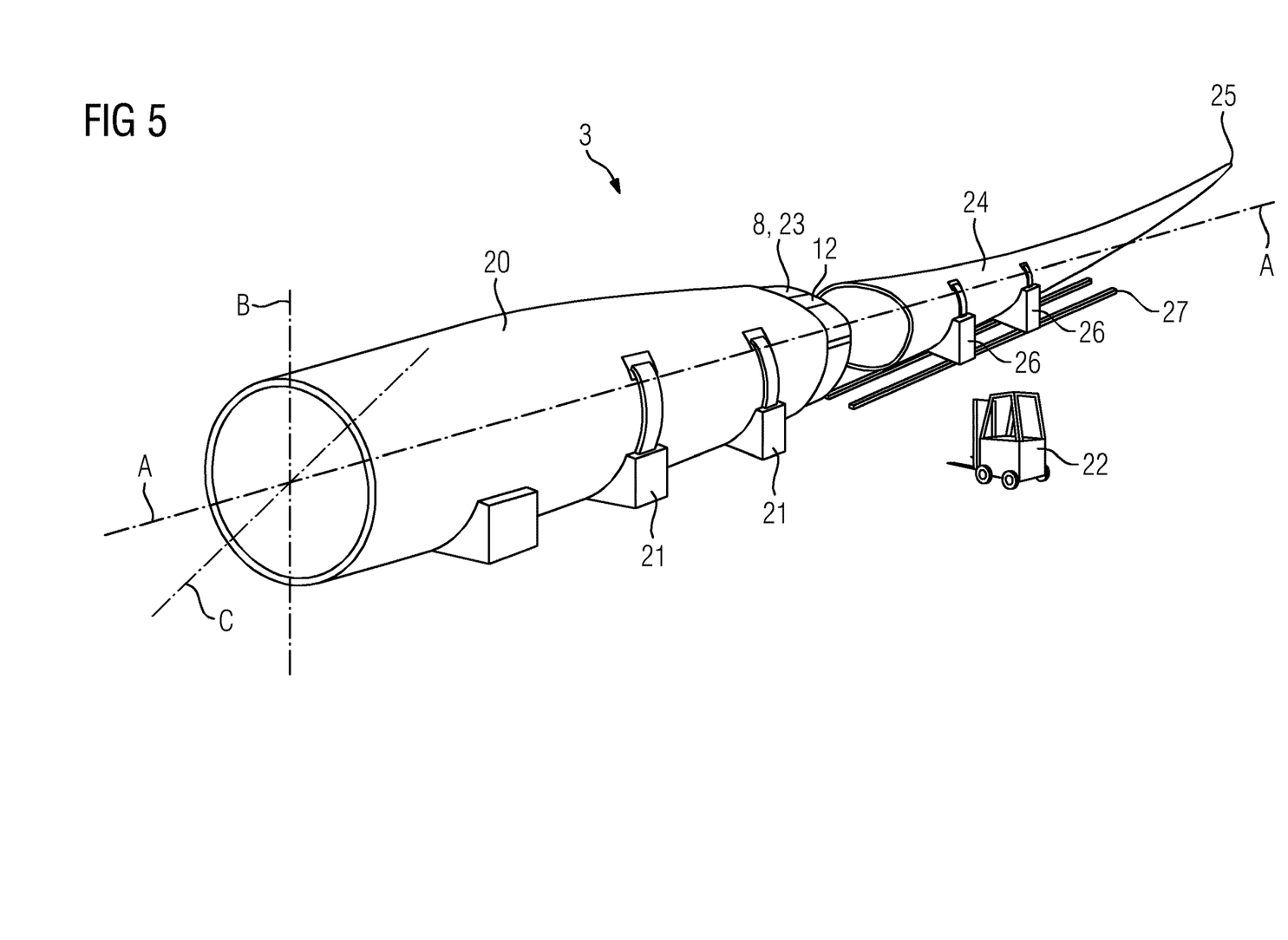
FIG. 5 shows a perspective view of a second blade section during arranging it adjacent to the first blade section of FIG. 4.

In FIG. 4, the first blade section 20 is fixed in position by alignment jigs 21. The joining portion 8 is inserted into the first blade section 20 by a lifting tool 22. The lifting tool 22 in this example is a lifting truck. The joining portion 8 is, in particular, inserted partially into the first blade section 20 such that a portion 23 of the joining portion 8 is protruding from the first blade section 20, as shown in FIG. 5.

Inserting the joining portion 8 into the first blade section 20 includes matching the fiber lay-ups 12, 13, 14, 15, 16, 17 of the joining portion 8 with corresponding layers of the first blade section 20.

In order to more easily insert the joining portion 8 into the first blade section 20, the cross-section size of the joining portion 8 may be reduced temporarily. This could be done by temporarily bending one or more of the fiber lay-ups 12, 13, 14, 15 for the beams. Another or an additional option would be inward folding of the hollow mandrel 9 in areas were no fiber lay-ups 12, 13, 14, 15 for the beams are present. After inserting the joining portion 8 into the first blade section 20 the original size of the cross section of the joining portion 8 may be re-established.

In step S3 of the method, a second blade section 24 of the blade 3 is arranged adjacent to the first blade section 20. In particular, the second blade section 24 is arranged adjacent to the first blade section 20 such that it accommodates the portion 23 of the joining portion 8 protruding from the first blade section 20, as shown in FIG. 5. In particular, the second blade section 24 is shoved onto the portion 23 of joining portion 8 until the second blade section 24 abuts the first blade section 20. The second blade section 24 is arranged adjacent to the first blade section 20 by an alignment jig 26. The alignment jig 26 is, for example, mounted such that the adjacent blade sections 20, 24 can be moved, e.g., on rails 27. Reference sign A denotes a longitudinal axis of the blade 3.

Arranging the second blade section 24 adjacent to the first blade section 20 includes matching the fiber lay-ups 12, 13, 14, 15, 16, 17 of the joining portion 8 with corresponding layers of the second blade section 24.

The second blade section 24 in this example is an outboard blade section. Further, in this example, the second blade section 24 comprises a blade tip 25. However, the second blade section 24 could also be an inboard blade section.

Figure 6:
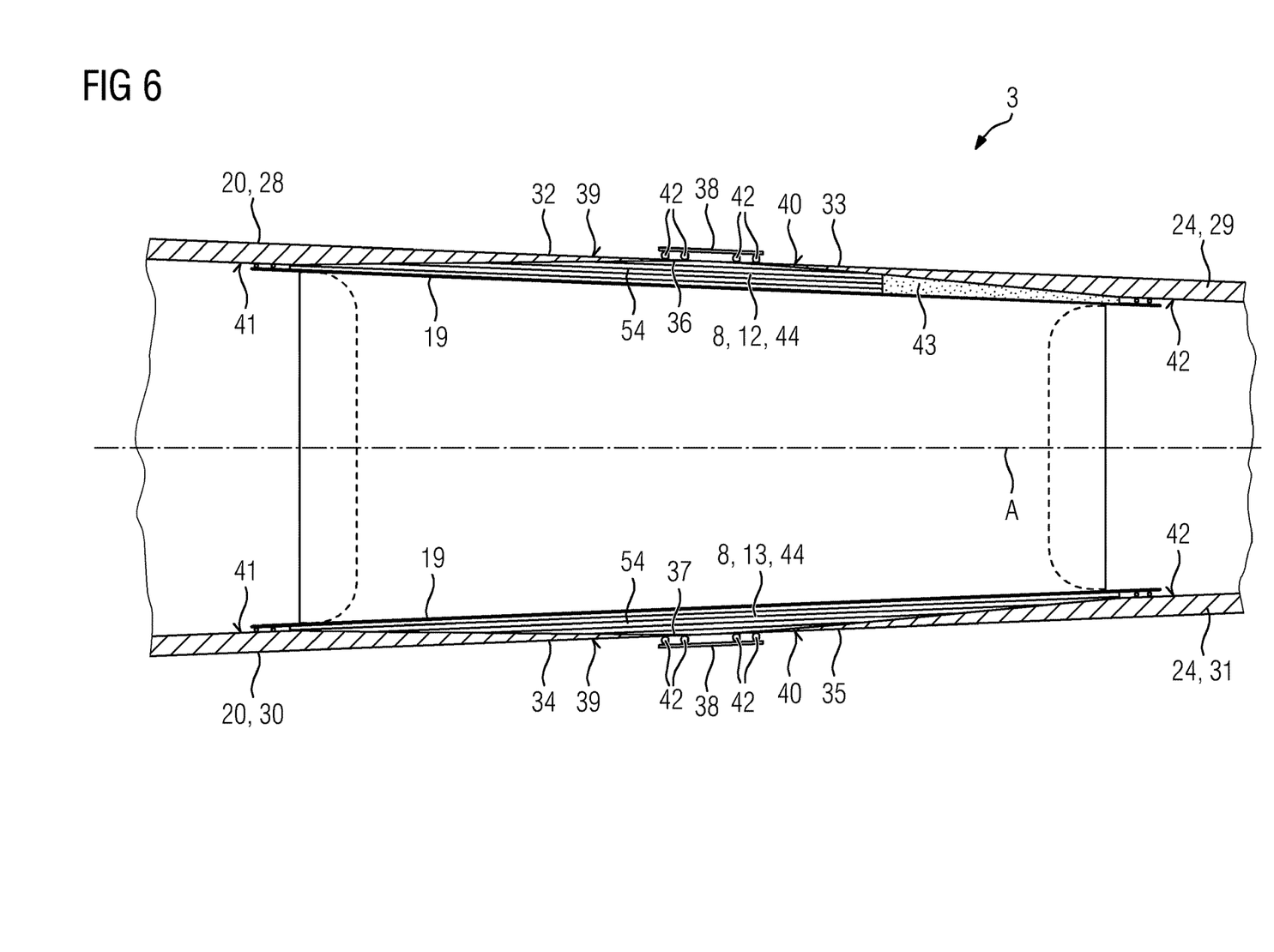
FIG. 6 shows a cross-section view of the first and second blade sections of FIG. 5 arranged adjacent to each other, the cross-section being taken along line B of FIG. 5.

FIG. 6 shows a cross-section view of a part of the blade 3 taken along line B in FIG. 5. Shown in FIG. 6 are the first and second blade sections 20 and 24 arranged adjacent to each other as well as the joining portion 8 arranged inside the first and second blade sections 20 and 24. The cross-section is taken through a pressure-side beam and a suction-side beam of the blade 3. In the upper part of FIG. 6 are shown the pressure-side beam 28 of the first blade section 20, the pressure-side beam joint 12 of the joining portion 8, and the pressure-side beam 29 of the second blade section 24 in cross-section. In the lower part of FIG. 6 are shown the suction-side beam 30 of the first blade section 20, the suction-side beam joint 13 of the joining portion 8, and the suction-side beam 31 of the second blade section 24.

Each of the pressure-side beams 28 and 29 and of the suction-side beams 30 and 31 comprises an outwardly tapered portion 32, 33, 34, 35. The outwardly tapered portions 32 and 33 of the pressure-side beams 28 and 29 of the first and second blade sections 20, 24 form a common recess 36. The fiber lay-up 12 for the pressure-side beam joint of the joining portion 8 is arranged in the common recess 36. Likewise, the outwardly tapered portions 34 and 35 of the suction-side beams 30 and 31 of the first and second blade sections 20, 24 form a common recess 37. The fiber lay-up 13 for the suction-side beam joint of the joining portion 8 is arranged in the common recess 37.

In step S4 of the method, the joining portion 8 and the adjacent first and second blade sections 20, 24 are at least partially covered with a vacuum bag 19, 38. In this example, one or more first vacuum bags 19 have already been provided in step 51 during prepacking the mandrel 9. In step S4, a second vacuum bag 38 is provided at the outside surfaces 39, 40 of the first and second blade sections 20, 24. In step S4, the vacuum bags 19, 38 are sealed around the inner surfaces 41, 42 and the outer surfaces 39, 40 of the first and second blade sections 20, 24. FIG. 6 shows the sealing of the vacuum bags 19, 38 covering the fiber lay-up 12 for the pressure-side beam joint and the fiber lay-up 13 for the suction-side beam joint. The sealing is schematically and exemplarily indicated by sealing points 42 in FIG. 6. The sealing of the vacuum bags 19, 38 might be done by applying a sealing tape or any other suitable method. Although not shown in FIG. 6, the vacuum bags 19 and 38 are also sealed around the fiber lay-ups 14, 15, 16, 17 for the leading and trailing edge beam joints, the web joint and the shell joint.

In step S5 of the method, a vacuum is generated within a cavity 54 defined by the sealed vacuum bags 19, 38. Then, a resin 43 is infused into the cavity 54 defined by the sealed vacuum bags 19, 38. FIG. 6 shows the resin 43 starting to fill the cavity 54 defined by the sealed vacuum bags 19, 38 and to embed the fiber lay-up 12 for the pressure-side beam joint. The infused resin 43 is fully embedding the fiber lay-ups 12, 13, 14, 15, 16, 17 of the joining portion 8. The resin 43 is then cured to obtain a cured joining portion. In FIG. 6 the reference sign 44 indicates the cured joining portion which is formed when the fiber lay-ups 12, 13 for the pressure-side and suction-side beam joints are fully embedded in the infused and cured resin 43. Although not shown in FIG. 6, the cured joining portion 44 also comprises the fiber lay-ups 14, 15, 16, 17 when embedded in the infused and cured resin 43. The vacuum infusion process may be a Vacuum Assisted Resin Transfer Moulding (VARTM) process. For further details of the generation of the vacuum, the infusion and curing of the resin 43, it is referred to EP 1 310 351 A1.

FIGS. 7 to 10 show a further and more detailed illustration of the steps S1 to S5 of the method. FIGS. 7 to 10 show the joining of the pressure-side beam of the blade 3 by the joining portion 8 including the fiber lay-up 12 for the pressure-side beam joint. However, the beam joint of FIGS. 7 to 10 could be any of the pressure-side beam joint 12, suction-side beam joint 13, leading edge beam joint 14 or trailing edge beam joint 15.

Figure 7:
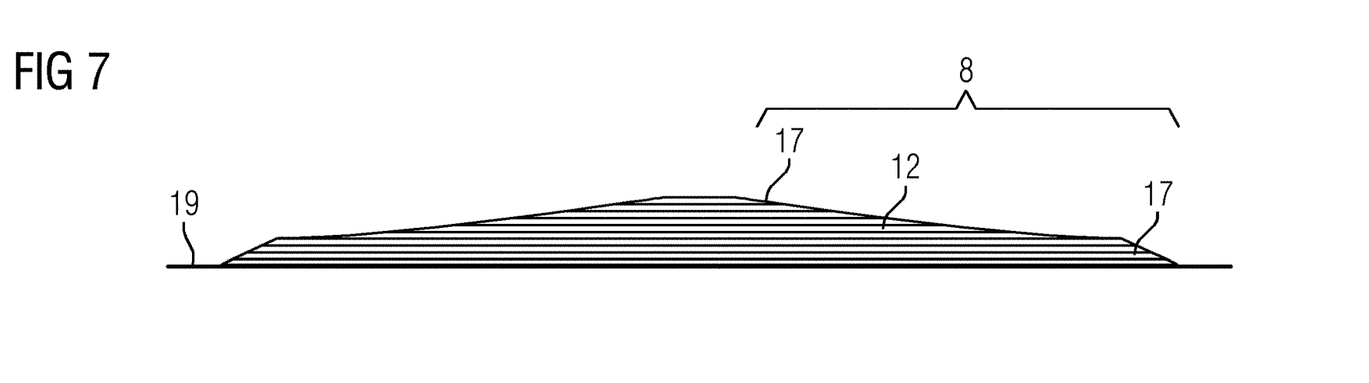
FIG. 7 shows a fiber lay-up for a beam joint of the joining portion of FIG. 2 in cross-section taken along line B of FIG. 5.

FIG. 7 shows the step S1 of prepacking the vacuum bag 19 and the joining portion 8 on the mandrel 9 (the mandrel 9 is only shown in FIG. 2). Firstly, the vacuum bag 19 is arranged on the mandrel 9, then the fiber lay-up 17 for an inner shell joint, the fiber lay-up 12 for the pressure-side beam joint, and the fiber lay-up 17 for an outer shell joint are arranged on the vacuum bag 19.

Figure 8:
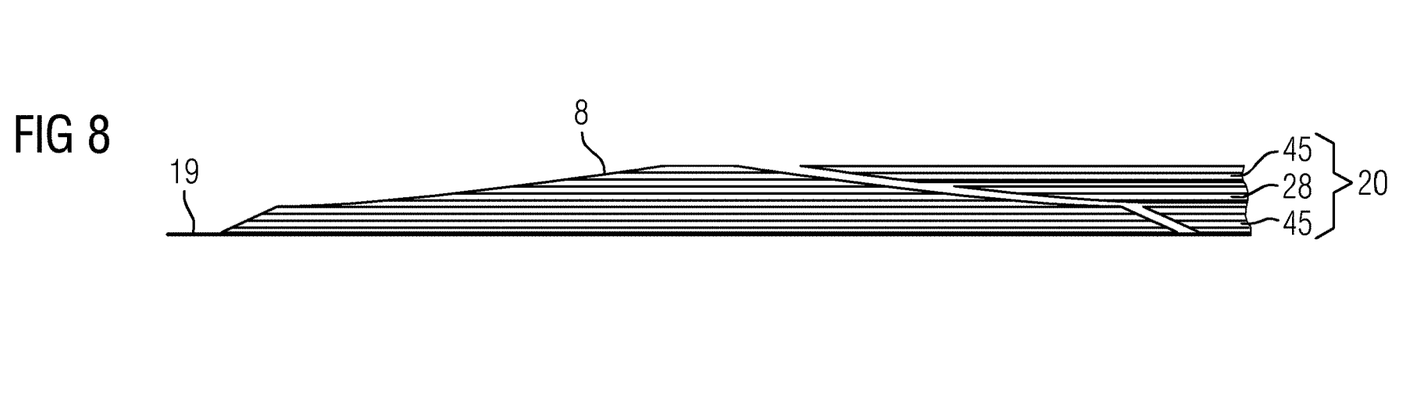
FIG. 8 shows a view similar as FIG. 7 but with the joining portion inserted into the first blade section.

FIG. 8 shows step S2 of partially inserting the prepacked joining portion 8 into the first blade section 20. The first blade section 20 comprises layers for the pressure-side beam 28 as well as layers 45 for the inner and outer shell. The joining portion 8 is inserted into the first blade section 20 such that the fiber lay-ups 12, 17 of the joining portion 8 match the corresponding layers 45, 28 of the first blade section 20.

Figure 9:
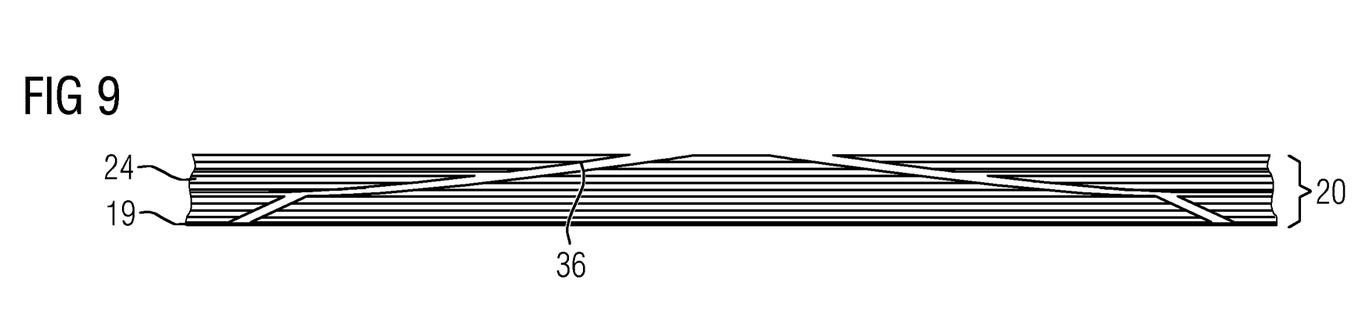
FIG. 9 shows a view similar as FIG. 8 but with the second blade section arranged adjacent the first blade section.

FIG. 9 shows step S3 of shoving the second blade section 24 onto the joining portion 8 such that the second blade section 24 abuts the first blade section 20 and the common recess 36 is formed.

Figure 10:
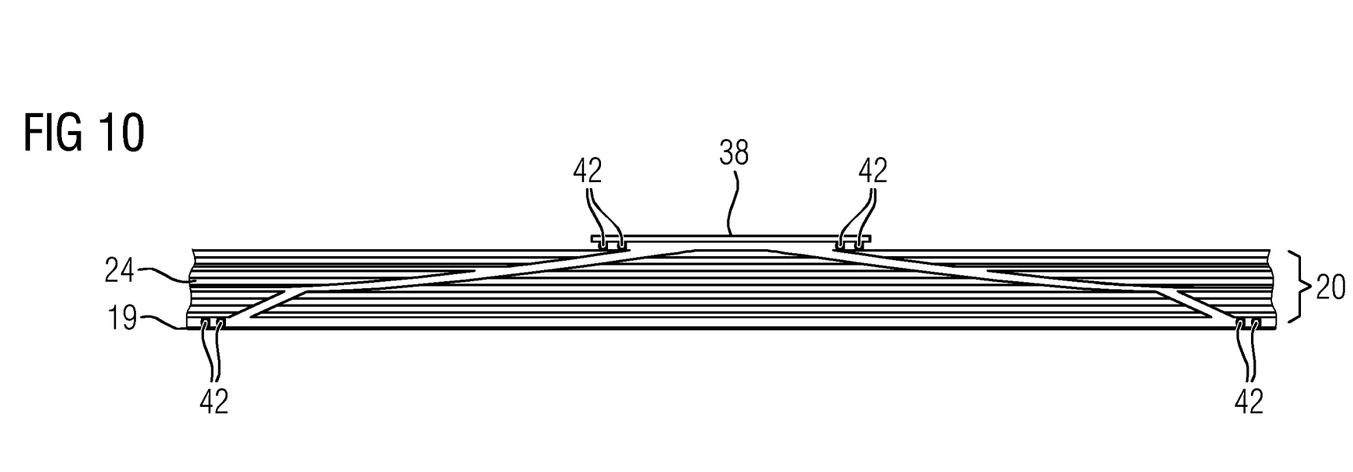
FIG. 10 shows a view similar as FIG. 9 but with a vacuum bag attached and sealed.

FIG. 10 shows step S4 of applying the second vacuum bag 38 and sealing the vacuum bags 19, 38. In the next step S5, a vacuum is generated inside the cavity defined by the sealed vacuum bags 19, 38 in order to infuse and cure the resin 43.

FIGS. 11 to 14 show a further illustration of steps S1 to S5 of the method displaying the joining of the shell in areas without a beam. FIGS. 11 to 14 each show a cross-section view taken along line C of FIG. 5.

Figure 11:
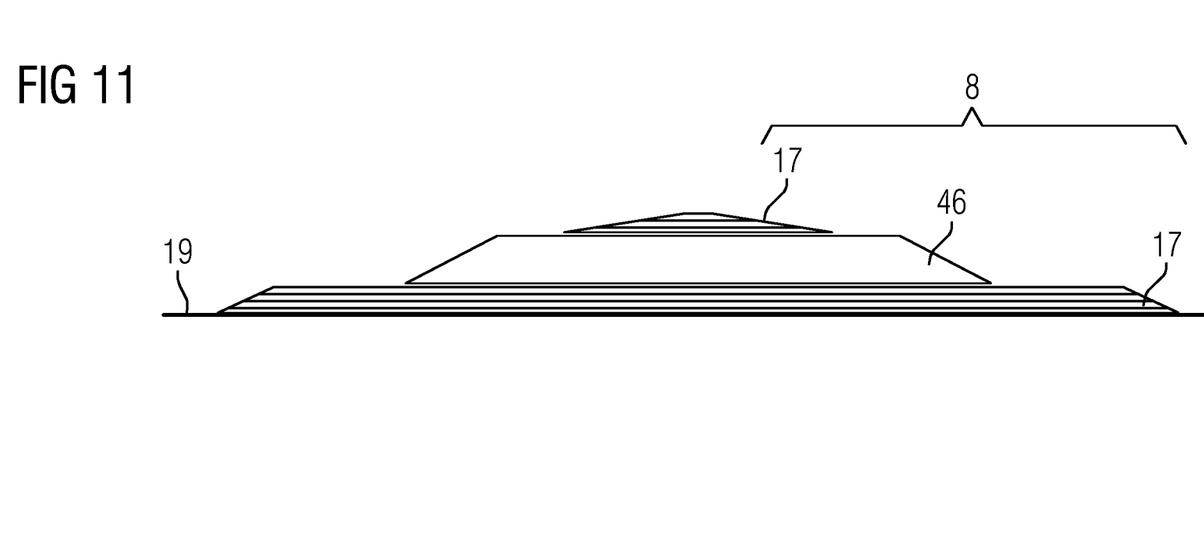
FIG. 11 shows a fiber lay-up for a shell joint of the joining portion of FIG. 2 in cross-section taken along line C of FIG. 5.

FIG. 11 shows step S1 of prepacking the vacuum bag 19 and the joining portion 8 on the mandrel 9 (the mandrel 9 is only shown in FIG. 2). Firstly, the vacuum bag 19 is arranged on the mandrel 9 and the fiber lay-up 17 for an inner shell joint is arranged on the vacuum bag 19. Then, a core material 46 such as balsa is arranged on the fiber lay-up 17 for the inner shell joint. Finally, the fiber lay-up 17 for an outer shell joint is arranged on the core material 46.

Figure 12:
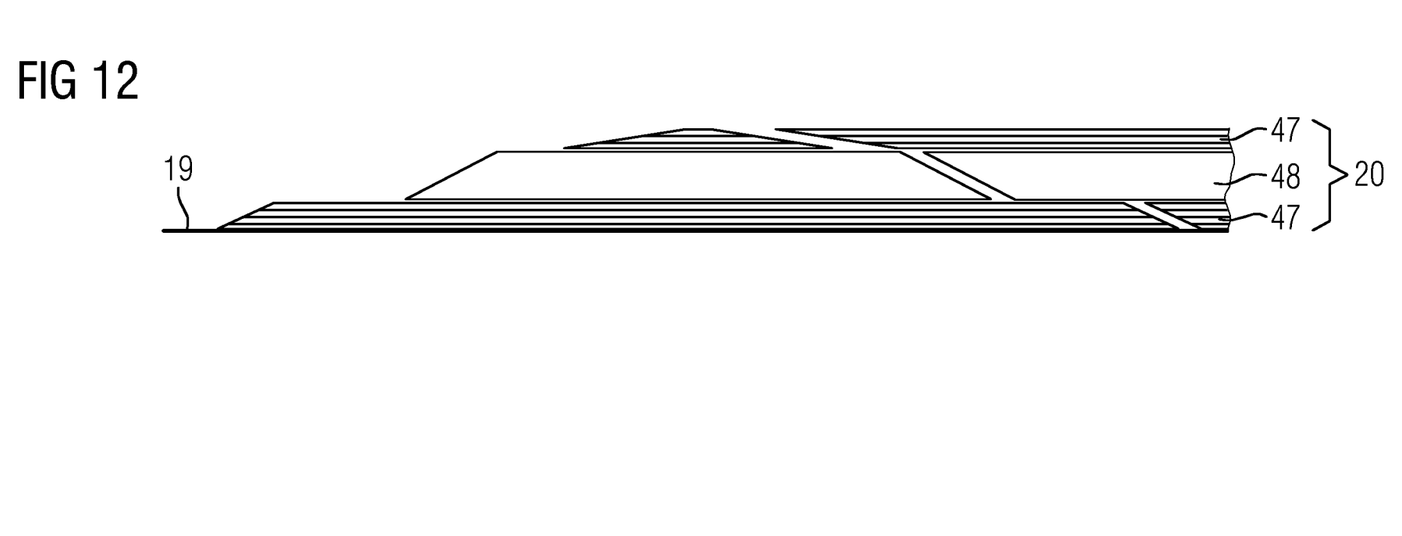
FIG. 12 shows a view similar as FIG. 11 but with the joining portion inserted into the first blade section.

FIG. 12 shows step S2 of partially inserting the prepacked joining portion 8 from FIG. 11 into the first blade section 20. The first blade section 20 comprises corresponding layers 47 for the shell and a corresponding core material 48. The joining portion 8 is inserted into the first blade section 20 such that the fiber lay-ups 17 and the core material 46 of the joining portion 8 match the corresponding layers 47 and corresponding core material 48 of the first blade section 20.

Figure 13:
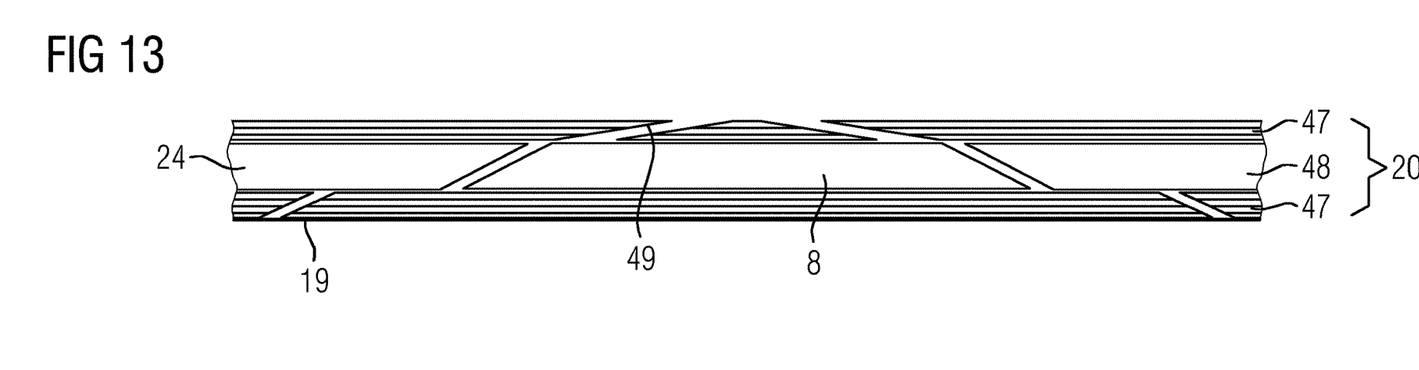
FIG. 13 shows a view similar as FIG. 12 but with the second blade section arranged adjacent the first blade section.

FIG. 13 shows step S3 of shoving the second blade section 24 onto the joining portion 8 such that the second blade section 24 abuts the first blade section 20 and a common recess 49 is formed.

Figure 14:
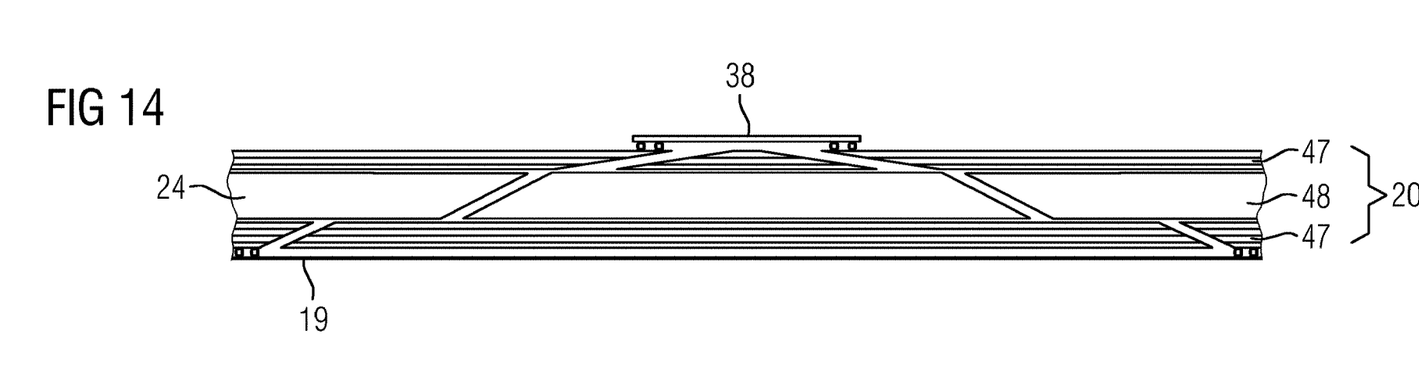
FIG. 14 shows a view similar as FIG. 13 but with a vacuum bag attached and sealed.

FIG. 14 shows step S4 of applying the second vacuum bag 38 and sealing the vacuum bags 19, 38. In the next step S5, a vacuum is generated inside the cavity defined by the sealed vacuum bags 19, 38 in order to infuse and cure the resin 43.

Figure 15:
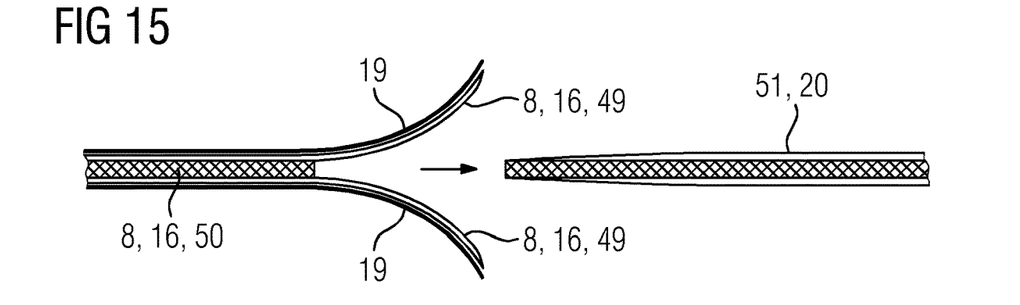
FIG. 15 shows a fiber lay-up for a web joint of the joining portion of FIG. 2 and the first blade section in cross-section taken along line D in FIG. 2.
Figure 16:
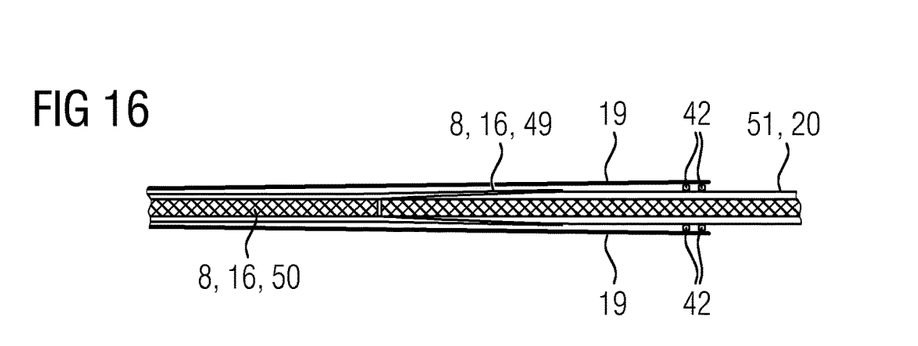
FIG. 16 shows a view similar as FIG. 15 but with the joining portion inserted into the first blade section.

FIGS. 15 and 16 illustrate joining a web of the blade 3 by the fiber lay-up 16 for the web joint. FIGS. 15 to 16 each show a cross-section view taken along line D of FIG. 2. In the example of FIGS. 15 and 16, the fiber lay-up 16 for the web joint comprises a dry fiber lay-up portion 49 and a pre-casted fiber lay-up portion 50. The dry fiber lay-up portion 49 is comprised of dry fibers without resin. The pre-casted fiber lay-up portion 50 is, in particular, comprised of fibers embedded in cured resin.

On the left part of FIG. 15, the prepacking of the joining portion 8 in step S1 is illustrated for the case of the web joint 16. Firstly, the vacuum bag 19 is arranged on the mandrel 9 (only shown in FIG. 2), in particular on the first and second portions 10, 11 of the mandrel 9. Then, the fiber lay-up 16 for the web joint is arranged between the vacuum bags 19. In step 2, the joining portion 8 is inserted in the first blade section 20 (FIG. 4). Thereby, the dry portion 49 of the fiber lay-up 16 for the web joint is accommodating a corresponding web element 51 of the first blade section 20.

In step S3, the second blade section 24 (not shown in FIGS. 15 and 16) is arranged adjacent to the first blade section 20. Thereby, the fiber lay-up 16 for the web joint of the joining portion 8 is joined with a corresponding web element (not shown) of the second blade section 24 in similar way as the illustrated joining of the fiber lay-up 16 of the joining portion 8 with the web element 51 of the first blade section 20.

In step S4 (FIG. 16), the vacuum bag 19 is sealed (sealing points 42 in FIG. 16). In step S5, vacuum is applied to a cavity defined by the sealed vacuum bag 19. Further, resin 43 is inserted into the cavity and cured.

Figure 17:
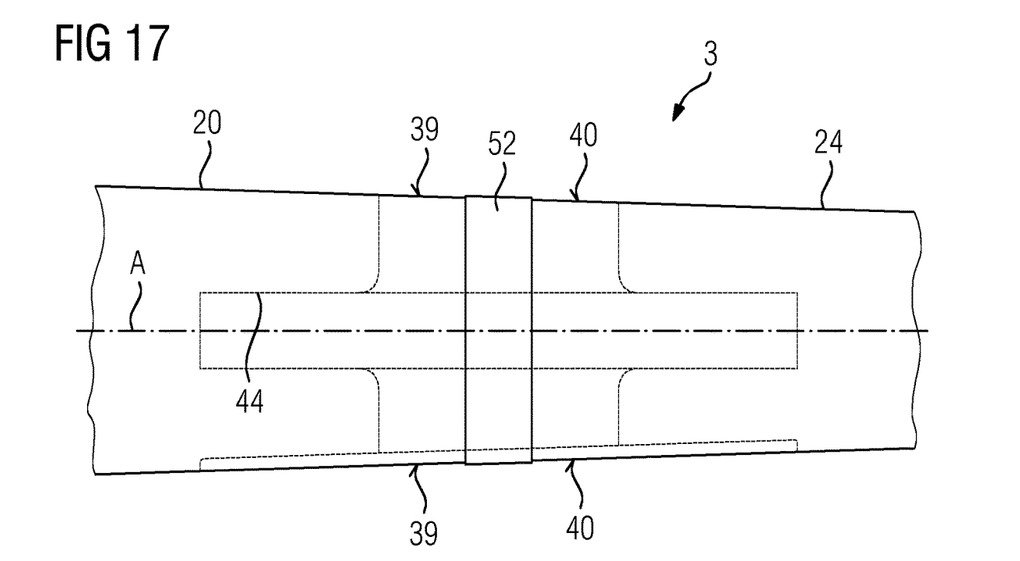
FIG. 17 shows an outside view of the first and second blade sections joined with each other by the joining portion.
Figure 18:
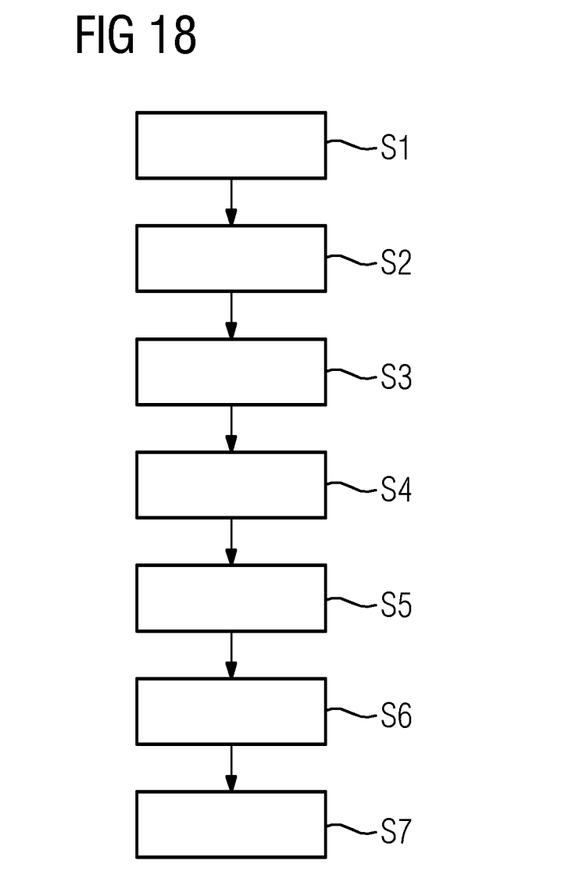
FIG. 18 shows a flowchart illustrating a method for manufacturing the wind turbine blade of the wind turbine of FIG. 1.

As shown in FIG. 17, in step S6 of the method, a sealing band 52, such as an adhesive tape, is applied to the outside surfaces 39, 40 of the first and second blade sections 20, 24. The sealing band 52 may cover any remaining gap at the boundary line between the first and second blade sections 20, 24.

In step S7, the mandrel 9 and the vacuum bags 19, 38 are removed from the blade 3, e.g., through a root section of the blade 3.

With the described method the whole joining process of joining two blade sections 20, 24 can be performed in one single process from inside the cavity of the blade 3. Furthermore, apart from eventually applying the sealing band 52, there is no finishing treatment of the outer surfaces 39, 40 of the blade 3 necessary.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing a wind turbine blade, comprising:
    arranging a joining portion comprising a fiber lay-up inside adjacent blade sections,
    covering the joining portion and the adjacent blade sections at least partially with a vacuum bag, and
    applying vacuum to a space covered by the vacuum bag, infusing at least the fiber lay-up with a resin, and curing the resin to obtain a cured joining portion joining the blade sections inside such that the cured joining portion joins the adjacent blade sections on their inside surfaces,
    wherein the joining portion is provided on a mandrel, and the joining portion is arranged inside the adjacent blade sections by arranging the mandrel with the joining portion inside the adjacent blade sections, and wherein the vacuum bag is prepacked with the joining portion on the mandrel.

2. The method according to claim 1, wherein each of the adjacent blade sections comprises an outwardly tapered portion such that the outwardly tapered portions form a common recess, and the joining portion is arranged inside the adjacent blade sections by arranging the joining portion in the common recess.

3. The method according to claim 1, wherein the fiber lay-up comprises a fiber lay-up forming, once cured, one or more beam joints joining one or more beams of a first one of the adjacent blade sections with one or more corresponding beams of a second one of the adjacent blade sections, and/or wherein the fiber lay-up comprises a fiber lay-up forming, once cured, a shell joint joining a shell of a first one of the adjacent blade sections with a shell of a second one of the adjacent blade sections, and/or wherein the fiber lay-up comprises a fiber lay-up forming, once cured, a web joint joining a web of a first one of the adjacent blade sections with a web of a second one of the adjacent blade sections.

4. The method according to claim 3, wherein the one or more beams comprise a pressure-side beam, a suction-side beam, a leading-edge beam or reinforcement and/or a trailing edge beam or reinforcement.

5. The method according to claim 1, wherein the joining portion is arranged inside the adjacent blade sections comprising a first one of the blade sections and a second one of the blade sections by:
    inserting the joining portion partially into the first one of the blade sections such that a portion of the joining portion protrudes from the first one of the blade sections, and
    arranging the second one of the blade sections adjacent to the first one of the blade sections such that the second one of the blade sections receives the portion of the joining portion protruding from the first one of the blade sections.

6. The method according to claim 1, wherein the joining portion is arranged inside the adjacent blade sections by a lifting tool.

7. The method according to claim 1, wherein the fiber lay-up includes at least one of glass fibers, carbon fibers, aramid fibers and natural fibers, and/or wherein the fiber lay-up comprises fibers in dry condition, and/or wherein the fiber lay-up includes a core material.

8. The method according to claim 1, wherein the resin includes at least one of thermosets, thermoplastics, epoxy, polyurethane, vinyl ester and polyester.

9. The method according to claim 1, comprising, after infusing and curing the resin, the step of applying a sealing band covering a separation line between the adjacent blade sections from the outside.

10. The method according to claim 7, wherein the core material includes wood, balsa, PET foam, and/or PVC foam.

11. The method according to claim 1, wherein the joining portion comprises a fiber lay-up for a pressure-side beam joint, a fiber lay-up for a suction-side beam joint, a fiber lay-up for a leading-edge beam joint, a fiber lay-up for a trailing edge beam joint, and a fiber lay-up for a web joint.

12. The method according to claim 11, wherein the joining portion further comprises a fiber lay-up for a shell joint.

13. A method for manufacturing a wind turbine blade, comprising:
    arranging a joining portion comprising a fiber lay-up inside adjacent blade sections, covering the joining portion and the adjacent blade sections at least partially with a vacuum bag, and applying vacuum to a space covered by the vacuum bag, infusing at least the fiber lay-up with a resin, and curing the resin to obtain a cured joining portion joining the blade sections inside such that the cured joining portion joins the adjacent blade sections on their inside surfaces, wherein the joining portion comprises a fiber lay-up for a pressure-side beam joint, a fiber lay-up for a suction-side beam joint, a fiber lay-up for a leading-edge beam joint, a fiber lay-up for a trailing edge beam joint, and a fiber lay-up for a web joint.

14. The method according to claim 13, wherein each of the adjacent blade sections comprises an outwardly tapered portion such that the outwardly tapered portions form a common recess, and the joining portion is arranged inside the adjacent blade sections by arranging the joining portion in the common recess.

15. The method according to claim 13, wherein the joining portion is provided on a mandrel, and the joining portion is arranged inside the adjacent blade sections by arranging the mandrel with the joining portion inside the adjacent blade sections.

16. The method according to claim 13, wherein the fiber lay-up comprises a fiber lay-up forming, once cured, one or more beam joints joining one or more beams of a first one of the adjacent blade sections with one or more corresponding beams of a second one of the adjacent blade sections; and/or wherein the fiber lay-up comprises a fiber lay-up forming, once cured, a shell joint joining a shell of a first one of the adjacent blade sections with a shell of a second one of the adjacent blade sections; and/or wherein the fiber lay-up comprises a fiber lay-up forming, once cured, a web joint joining a web of a first one of the adjacent blade sections with a web of a second one of the adjacent blade sections.

17. The method according to claim 13, wherein the joining portion is arranged inside the adjacent blade sections comprising a first one of the blade sections and a second one of the blade sections by:

inserting the joining portion partially into the first one of the blade sections such that a portion of the joining portion protrudes from the first one of the blade sections, and arranging the second one of the blade sections adjacent to the first one of the blade sections such that the second one of the blade sections receives the portion of the joining portion protruding from the first one of the blade sections.

18. The method according to claim 13, comprising, after infusing and curing the resin, the step of applying a sealing band covering a separation line between the adjacent blade sections from the outside.

19. The method according to claim 15, wherein the vacuum bag is prepacked with the joining portion on the mandrel.

20. The method according to claim 13, wherein the joining portion further comprises a fiber lay-up for a shell joint.

* * * * *